United States Patent
Amaya et al.

(10) Patent No.: US 10,596,654 B2
(45) Date of Patent: Mar. 24, 2020

(54) METAL POWDER PROCESSING EQUIPMENT

(71) Applicant: Matsuura Machinery Corporation, Fukui (JP)

(72) Inventors: Koichi Amaya, Fukui (JP); Toshihiko Kato, Fukui (JP); Hideto Matsubara, Fukui (JP); Mitsuyoshi Yoshida, Fukui (JP)

(73) Assignee: Matsuura Machinery Corporation, Fukui, Fukui (JP)

( * ) Notice: Subject to any disclaimer, the term of this patent is extended or adjusted under 35 U.S.C. 154(b) by 577 days.

(21) Appl. No.: 14/536,610

(22) Filed: Nov. 8, 2014

(65) Prior Publication Data

US 2015/0283649 A1 Oct. 8, 2015

(30) Foreign Application Priority Data

Apr. 4, 2014 (JP) ................. 2014-077654

(51) Int. Cl.
| | |
|---|---|
| B23K 26/14 | (2014.01) |
| B23K 15/00 | (2006.01) |
| B23Q 11/00 | (2006.01) |
| B22F 3/105 | (2006.01) |
| B22F 3/24 | (2006.01) |
| B33Y 30/00 | (2015.01) |
| B33Y 40/00 | (2020.01) |

(52) U.S. Cl.
CPC ........ *B23K 15/0086* (2013.01); *B22F 3/1055* (2013.01); *B22F 3/24* (2013.01); *B23Q 11/005* (2013.01); *B22F 2003/1056* (2013.01); *B22F 2003/1059* (2013.01); *B22F 2003/247* (2013.01); *B33Y 30/00* (2014.12); *B33Y 40/00* (2014.12); *Y02P 10/295* (2015.11)

(58) Field of Classification Search
CPC .............. B23K 26/063; B23K 26/0635; B23K 26/0656; B23K 26/067; B23K 2201/40
USPC ............... 219/121.6; 76/101.1, 108.6, 108.1; 409/11, 119, 118
See application file for complete search history.

(56) References Cited

U.S. PATENT DOCUMENTS

| | | | | |
|---|---|---|---|---|
| 4,011,792 A | * | 3/1977 | Davis ................... | B23Q 11/006 409/137 |
| 4,540,055 A | * | 9/1985 | Drummond ............ | E21B 21/16 175/323 |

(Continued)

FOREIGN PATENT DOCUMENTS

| | | |
|---|---|---|
| JP | 6-21909 U | 3/1994 |
| JP | 7-299622 A | 11/1995 |

(Continued)

*Primary Examiner* — Tu B Hoang
*Assistant Examiner* — Thomas J Ward
(74) *Attorney, Agent, or Firm* — Richard M. Goldberg

(57) ABSTRACT

In metal powder processing equipment where metal powder is sequentially laminated on a table inside a chamber and laser beam melting or electron beam melting, and shaping by a cutting tool subsequent to the melting are performed, unmolded powder remaining at the time of the melting and cut powder generated by the cutting can be scattered by generating air flow with respect to the cutting tool from either side of a main shaft or a tool holder. As a result, life of the cutting tool is prolonged and quality of a cut surface can be improved.

1 Claim, 5 Drawing Sheets

(56) References Cited

U.S. PATENT DOCUMENTS

| | | | | |
|---|---|---|---|---|
| 6,036,412 | A | * | 3/2000 | Dalla ................ B23Q 11/0046 408/56 |
| 8,946,585 | B2 | * | 2/2015 | Kappmeyer .......... B22F 3/1055 219/121.6 |
| 2007/0283786 | A1 | * | 12/2007 | Kappmeyer .......... B22F 3/1055 76/101.1 |
| 2009/0311055 | A1 | * | 12/2009 | Galota ...................... B23C 5/28 407/11 |

FOREIGN PATENT DOCUMENTS

| | | |
|---|---|---|
| JP | 10-225814 A | 8/1998 |
| JP | 11-277361 A | 10/1999 |
| JP | 2006-192362 A | 7/2006 |
| JP | 2010-280173 A | 12/2010 |
| JP | 2011-110614 A | 6/2011 |

\* cited by examiner

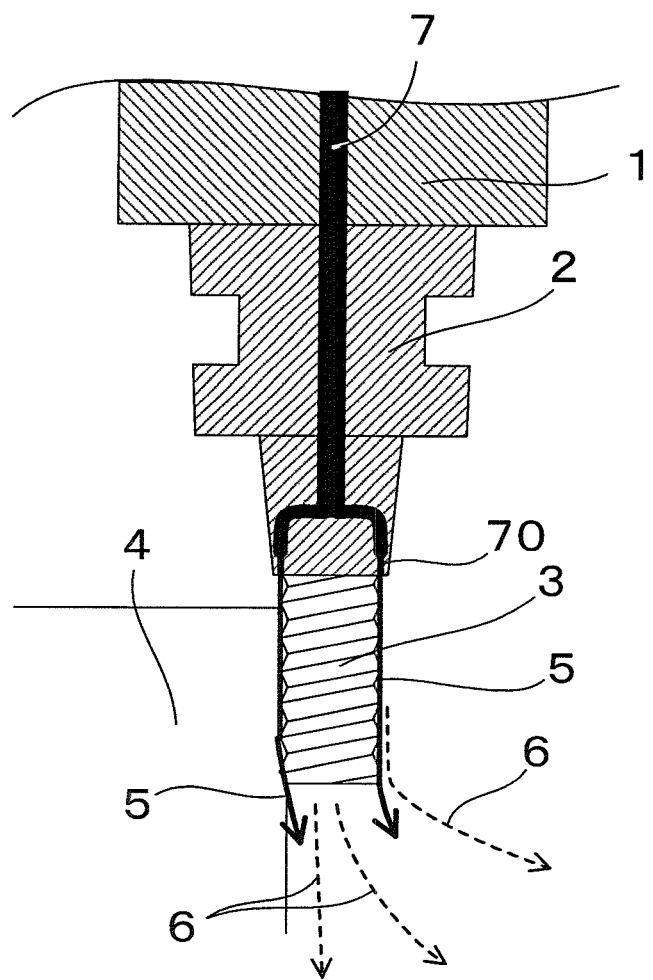
[Fig 3]

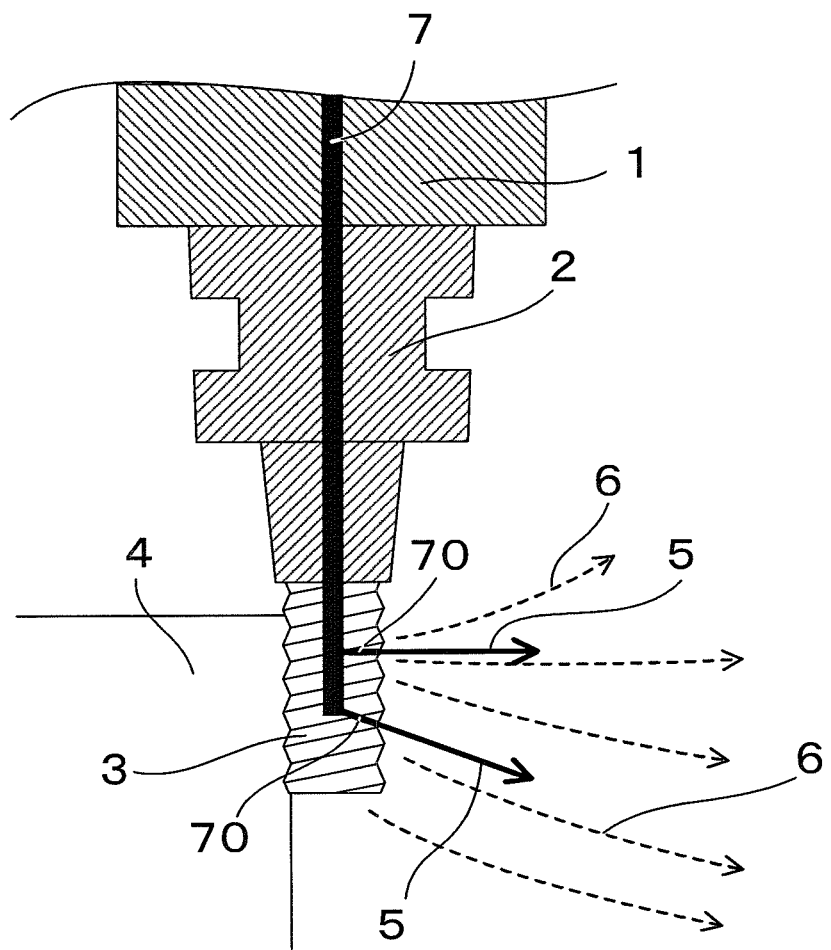
[Fig 4]

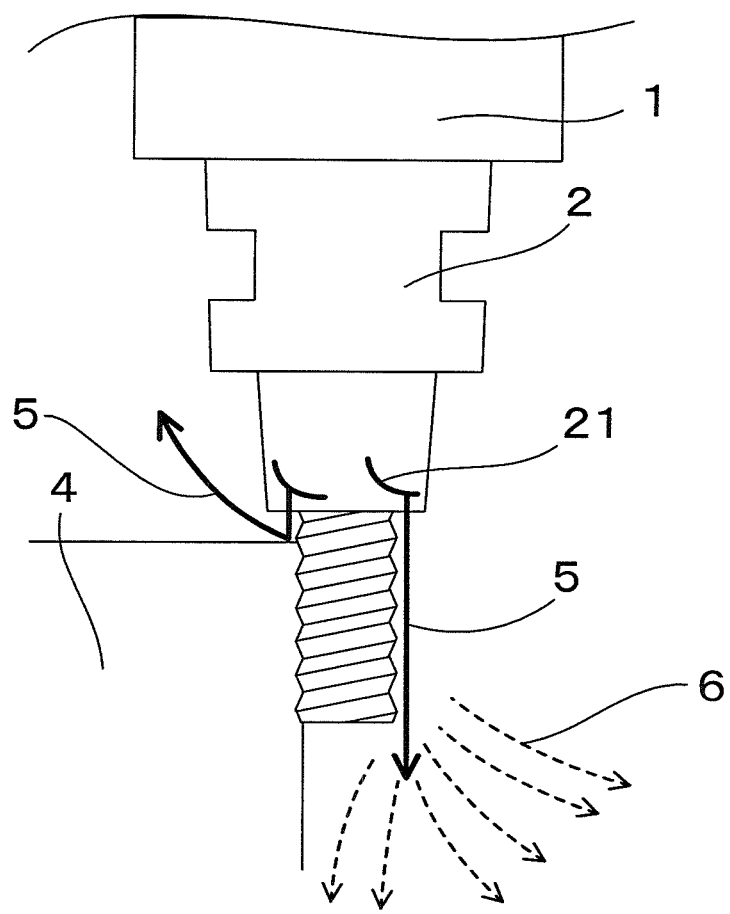
[Fig 5]

METAL POWDER PROCESSING EQUIPMENT

TECHNICAL FIELD

The present invention relates to metal powder processing equipment in which metal powder is sequentially laminated on a table inside a chamber, and laser beam melting or electron beam melting, and shaping by a cutting tool subsequent to the melting are performed.

BACKGROUND OF THE INVENTION

In the above-mentioned melting step, unmolded powder remains near a molded object, and powdery cut chips generated by the cutting remain near a molded object in the above-mentioned cutting process step.

In the case of continuing the cutting process in a state in which the unmolded powder and cut powder remain, not only the life of the cutting tool is extremely shortened but also damage occurs on the cutting tool because of the unmolded powder and cut powder remaining at a cutting edge of the cutting tool.

Additionally, in the case where cutting process is executed being tangled with the unmolded powder and cut powder, a cut surface may be affected and a smooth surface may not be obtained. As a result, even quality of the processed surface is deteriorated.

To handle such a situation, Patent Document 1, JP 2010-280173 A discloses a method in which a tool for removing unmolded powder and cut powder is actuated besides a tool for cutting process, thereby removing the unmolded powder and cut powder.

However, according to this method, the extra tool for removing the unmolded powder and cut powder is required to be installed, and it is unavoidable to cause not only complication of an equipment structure and driving control but also complication of the processing step.

Patent Document 2, JP 11-277361 A discloses a configuration in which unmolded powder and cut powder (cut chips) are sucked by air flow, and the unmolded powder and cut powder are moved through a pipe 1763 and transferred to a suction device 1764 side.

However, in the case of the above-mentioned configuration, the air flow is merely adopted as a post-processing for the unmolded powder remaining at the time of the melting and the cut powder generated by the cutting, and configuration for scattering the unmolded powder and cut powder remaining at the cutting edge of the cutting tool is not disclosed.

Actually, Patent Document 2 does not discuss anything about adverse effect caused by the unmolded powder and cut powder remaining at the cutting edge of the cutting tool.

As is obvious from the known arts disclosed in the above-mentioned Patent Document 1 and Patent Document 2 the configuration for scattering the unmolded powder remaining at the time of the melting and the cut powder generated by the cutting from a cutting edge of the cutting tool has not been proposed so far.

PRIOR ART DOCUMENTS

Patent Document

Patent Document 1: JP 2010-280173 A
Patent Document 2: JP 11-277361 A

SUMMARY OF THE INVENTION

Problems to be Solved by the Invention

The present invention is directed to providing a configuration of metal powder processing equipment that can avoid unfavorable influence to a cutting tool from unmolded powder remaining at the time of laser beam melting or electron beam melting and cut powder generated at the time of cutting and shaping.

To solve the above-mentioned problems, a basic configuration according to the present invention includes:

(1) in metal powder processing equipment in which metal powder is sequentially laminated on a table inside a chamber, and laser beam melting or electron beam melting and shaping by a cutting tool subsequent to the melting are performed, with the cutting tool held by a tool holder connected with a main shaft, the improvement comprising:
  an arrangement which generates an air flow to a side surface of the cutting tool which rotates along a central axis of the cutting tool and which flows the air in a longitudinal direction of the cutting tool to scatter unmolded powder remaining at the time of melting and cut powder generated by cutting, the arrangement being provided at the tool holder for the cutting tool,
  the arrangement including:
    plural air flow pass holes formed between a portion of a center of rotation at a rear end of the main shaft and a portion deviated from the center of rotation at a leading end of the main shaft, and
    plural jet exits at outlet ends of the air pass holes, the jet exits angled relative to the center rotational axis in such a manner that the air flow follows a slanting direction relative to the center rotational axis from the jet exits at the outlet ends of the air flow pass holes and collides with the side cutting surface along a longitudinal direction of the cutting tool, with the jet exits formed at a leading end surface of the main shaft.

EFFECT OF THE INVENTION

According to the present invention based on the above-mentioned basic configuration, the unmolded powder and cut powder are scattered from a cutting edge of the cutting tool or the vicinity thereof by the air flow generated by the metal powder processing equipment itself, and further, the life of the cutting tool is prolonged and quality of the cut surface is improved while processing time can be also shortened by securing smooth rotation of the cutting tool.

BRIEF DESCRIPTION OF DRAWINGS

FIG. 3 is a sectional side view illustrating an embodiment in which the air flow pass holes are provided at the main shaft and a tool holder;

FIG. 4 is a sectional side view illustrating an embodiment in which the air flow pass holes are provided at the main shaft, the tool holder, and a cutting tool;

Note that an area of the cutting tool illustrates its side view, in which particularly movement of air flow is indicated by the solid arrows in the same manner as other drawings; and FIG. 5 is a side view illustrating a configuration according to an embodiment.

DETAILED DESCRIPTION

The present invention is aimed at metal powder processing equipment in which metal powder is sequentially laminated on a table inside a chamber, and laser beam melting or electron beam melting and shaping by a cutting tool subsequent to the melting are performed.

Figure 1:
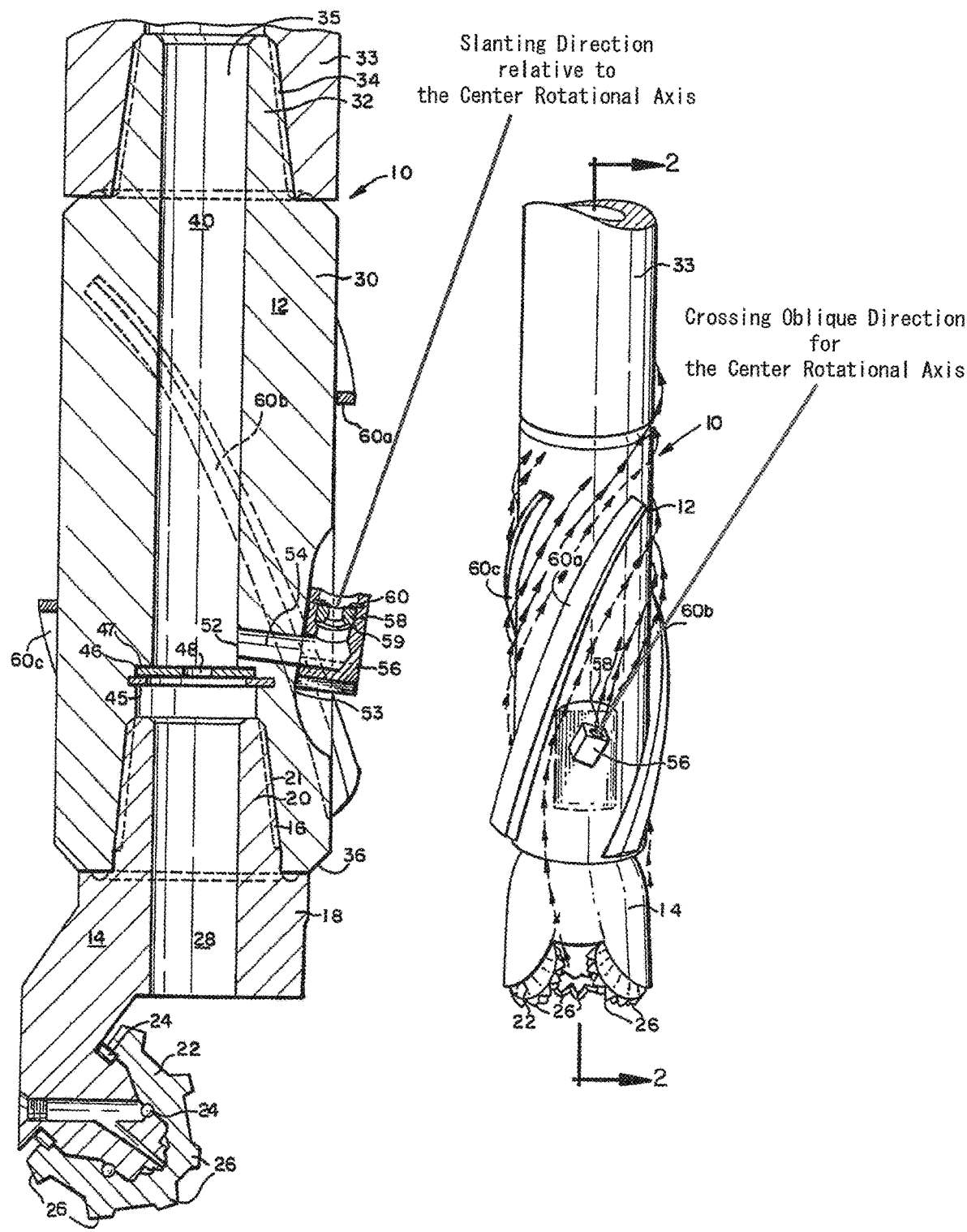
FIG. 1 is a side view illustrating a basic principle of the present invention; Note that a solid arrow indicates a flow direction of air flow, and a dotted arrow indicates a flow direction of unmolded powder and cut powder, and these arrows are used in the same manner in the drawings hereinafter.

FIG. 1 is a view disclosing a basic configuration according to the present invention and illustrating a state of cutting process in which air flow 5 at a side surface of the cutting tool in a longitudinal direction, or vicinity of said side surface is generated for scattering unmolded powder and cut powder 6 from a tool holder 2 side toward a leading end side of a cutting tool 3.

Air pressure by the air flow 5 is generated when cutting is performed by the cutting tool 3, and it is indispensable for the air pressure to be strong enough to scatter the unmolded powder and cut powder 6 flowing in a vicinity of the cutting tool 3.

In the case of scattering the flowing unmolded powder and cut powder 6 by this air flow 5, probability that the unmolded powder and cut powder 6 remain at a main shaft 1 of the cutting tool 3 in a rotating state can be reduced. As a result, it is possible to avoid shortening the life of the cutting tool 3 due to the unmolded powder and cut powder 6 being filled in clearance with a cutting edge, and further, the cutting tool 3 can be prevented from being damaged. Moreover, deterioration of processed surface quality such as the prior arts may also be avoided.

According to a typical embodiment of the above-mentioned basic configuration, the unmolded powder and cut powder 6 are scattered by jetting the air flow 5.

Figure 2:
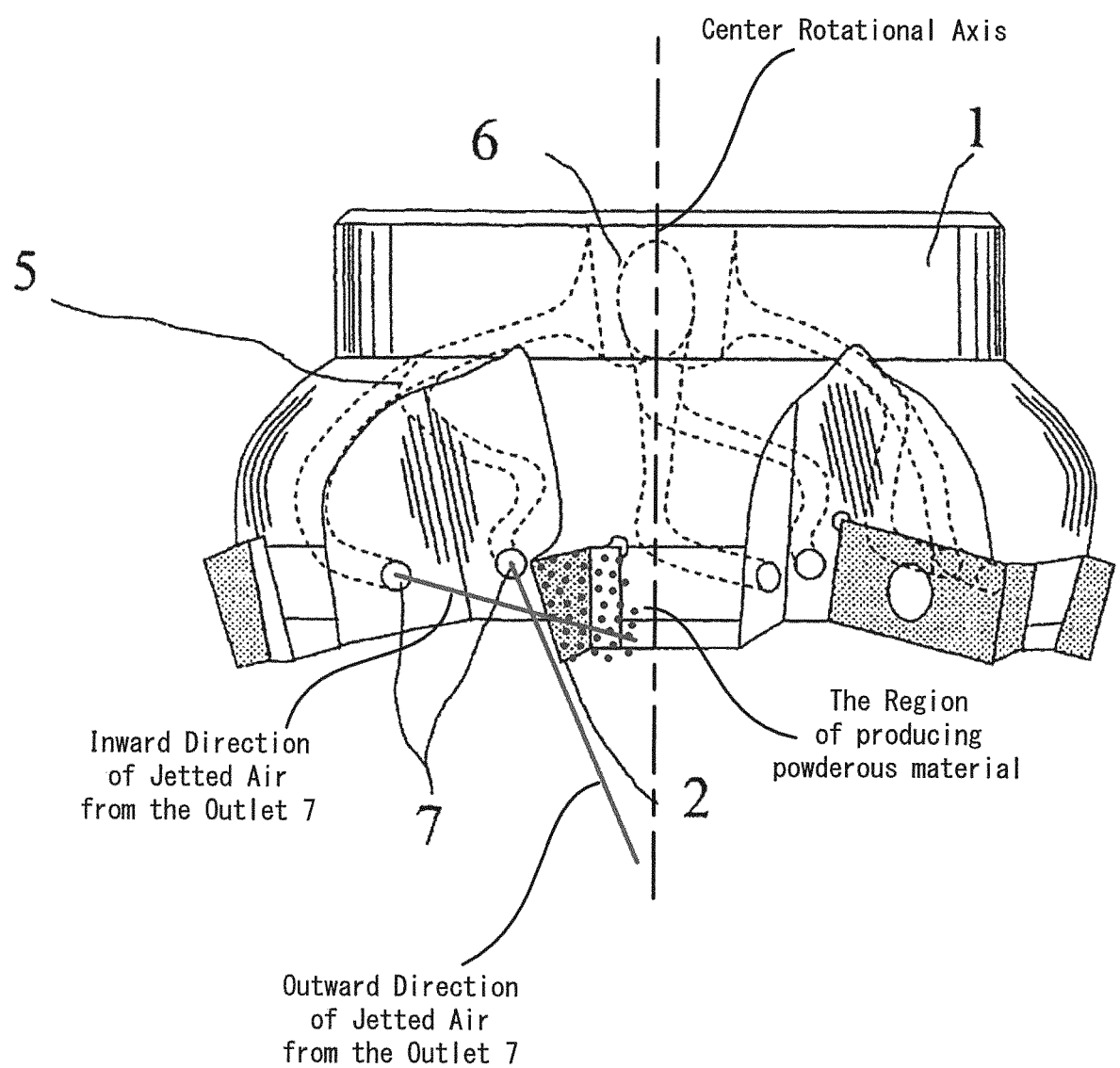
FIG. 2 is a sectional side view illustrating an embodiment in which an air flow pass hole is provided at a main shaft.

FIG. 2 is a view illustrating a basic configuration (1) in which an air flow pass hole 7 is formed between a portion of a center of rotation at a rear end of the main shaft 1 and a portion deviated from the center of rotation at a leading end of the main shaft 1, and plural jet exits 70 at outlet ends of the air pass holes 7, the jet exits 70 angled relative to the center rotational axis in such a manner that the air flow follows a slanting direction relative to the center rotational axis from the let exits 70 at the outlet ends of the air flow pass holes 7 and collides with the side cutting surface along a longitudinal direction of the cutting tool 3, with the jet exits formed at a leading end surface of the main shaft 1.

In the case of the above-described embodiment, the unmolded powder and cut powder 6 flowing in the vicinity of the cutting tool 3 can be effectively scattered by jetting the air flow 5 to the side surface of the cutting tool 3 in the longitudinal direction from the leading end surface of the main shaft 1, and can be prevented from being adhered to the cutting tool 3.

In FIG. 2, the jet exit 70 is formed at only one place, but the jet exit 70 can be formed at a plurality of places.

FIG. 3 is a view illustrating an embodiment in which the air flow pass hole 7 is continuously formed along a central axis of the main shaft 1 and then along a central axis of a middle portion from a rear end to a leading end of the tool holder 2, and the jet exit 70 is formed for the air flow 5 to the side face of the cutting tool 3 in the longitudinal direction from a vicinity of a connecting portion with the cutting tool 3 at a leading end surface of the tool holder 2.

In the case of the above-mentioned embodiment, the unmolded powder and cut powder 6 flowing in the vicinity of the cutting tool 3 are scattered by the air flow 5 jetted to a peripheral wall in the longitudinal direction of the cutting tool 3 and vicinity thereof, and can be prevented from adhering to the cutting tool 3.

FIG. 4 is a view illustrating an embodiment in which the air flow pass hole 7 is continuously formed along the central axis of the main shaft 1, the tool holder 2, and the central axis in the longitudinal direction of the cutting tool 3, and the jet exit 70 is formed for the air flow 5 in a direction orthogonal and/or oblique to the longitudinal direction of the cutting tool 3 at one place or a plurality of places on an outer peripheral portion or a groove of the cutting tool 3 at the middle portion or a leading end portion in the longitudinal direction of the cutting tool 3.

In the case of FIG. 4 only one jet exit 70 is formed for the air flow 5 in the direction orthogonal and/or oblique to the longitudinal direction. By thus forming the jet exit 70, the unmolded powder and cut powder 6 flowing in the longitudinal direction in the vicinity of the cutting tool 3 can be scattered by the air flow 5 and can be prevented from adhering to the cutting tool 3.

According to any of the above-mentioned embodiments, the unmolded powder and cut powder 6 are scattered by the jetted air flow 5.

However, note that the above-mentioned basic configuration is not limited to the above-mentioned embodiments of jetting the air flow 5, and this is obvious from an embodiment described below.

Embodiment

According to another embodiment, one or a plurality of rotor blades 21 that blows air flow 5 to a cutting tool 3 side is arranged to a peripheral wall of a side surface of a tool holder 2 for generating air flow 5 at vicinity of the said surface of the cutting tool 3 in a longitudinal direction as illustrated in FIG. 5.

In the case of such an embodiment, unmolded powder and cut powder 6 likely to adhere to the cutting tool 3 can be scattered by an extremely simple configuration of attaching the rotor blades (fins) 21 to the peripheral wall of the side surface of the tool holder 2.

As illustrated in FIG. 5, the rotor blades (fins) 21 generally adopt a configuration in which an inclination angle is sequentially increased in the rotational direction as is the case with a propeller, and preferably a plurality of rotor blades is provided along the peripheral wall of the tool holder 2. Further, in the case where a plane angle of the rotor blades (fins) 21 is about 45 degrees with respect to a rotational direction, it can be observed that the air flow 5 can be effectively generated with respect to the cutting tool 3 side.

APPLICABILITY OF THE INVENTION

The present invention can solve the problems in the related arts and can be utilized in any field of the metal powder processing equipment using a cutting tool by removing the unmolded powder remaining at the time of the melting and the cut powder generated by the cutting.

EXPLANATION OF REFERENCES 1 main shaft
2 tool holder 3 cutting tool
4 object to be molded
5 air flow
6 unmolded powder and cut powder
7 air flow pass hole
70 jet exit

What is claimed is:

1. In metal powder processing equipment in which metal powder is sequentially laminated on a table inside a chamber, and laser beam melting or electron beam melting and shaping by a cutting tool subsequent to the melting are performed, with the cutting tool held by a tool holder connected with a main shaft, the improvement comprising:

an arrangement which generates plural air flows to a side cutting surface of the cutting tool along a longitudinal direction of the cutting tool, which rotates along a central rotational axis of the cutting tool and which flows the air in the longitudinal direction of the cutting tool to scatter unmolded powder remaining at the time of melting and cut powder generated by cutting, the arrangement being provided at the main shaft for the cutting tool, the arrangement including:

plural air flow pass holes formed in the main shaft between a portion of a center of rotation at a rear end of the main shaft and a portion deviated from the center of rotation at a leading end of the main shaft, and plural jet exits at outlet ends of the air pass holes at the portion deviated from the center of rotation at the leading end of the main shaft, the jet exits angled inwardly relative to the center rotational axis along which the rotating cutting surface of the cutting tool along a longitudinal direction of the cutting tool rotates in such a manner that the air flow in a state of rotation follows a slanting direction relative to the center rotational axis from the jet exits at the outlet ends of the air flow pass holes and directed in a direction inwardly toward the cutting tool for colliding with the side cutting surface along the longitudinal direction of the cutting tool, with the jet exits formed at a leading end surface of the main shaft.

* * * * *

UNITED STATES PATENT AND TRADEMARK OFFICE
CERTIFICATE OF CORRECTION

| | |
|---|---|
| PATENT NO. | : 10,596,654 B2 |
| APPLICATION NO. | : 14/536610 |
| DATED | : March 24, 2020 |
| INVENTOR(S) | : Koichi Amaya et al. |

It is certified that error appears in the above-identified patent and that said Letters Patent is hereby corrected as shown below:

On the Title Page

Delete the Title Page and substitute therefore with attached Title Page consisting of the corrected illustrative figure(s).

In the Drawings

Please replace FIGS. 1-2 with FIGS. 1-2 as shown on the attached pages.

Signed and Sealed this
Twenty-first Day of July, 2020

Andrei Iancu
*Director of the United States Patent and Trademark Office*

(12) United States Patent
Amaya et al.

(10) Patent No.: US 10,596,654 B2
(45) Date of Patent: Mar. 24, 2020

(54) METAL POWDER PROCESSING EQUIPMENT

(71) Applicant: Matsuura Machinery Corporation, Fukui (JP)

(72) Inventors: Koichi Amaya, Fukui (JP); Toshihiko Kato, Fukui (JP); Hideto Matsubara, Fukui (JP); Mitsuyoshi Yoshida, Fukui (JP)

(73) Assignee: Matsuura Machinery Corporation, Fukui, Fukui (JP)

( * ) Notice: Subject to any disclaimer, the term of this patent is extended or adjusted under 35 U.S.C. 154(b) by 577 days.

(21) Appl. No.: 14/536,610

(22) Filed: Nov. 8, 2014

(65) Prior Publication Data

US 2015/0283649 A1 Oct. 8, 2015

(30) Foreign Application Priority Data

Apr. 4, 2014 (JP) .................. 2014-077654

(51) Int. Cl.
*B23K 26/14* (2014.01)
*B23K 15/00* (2006.01)
*B23Q 11/00* (2006.01)
*B22F 3/105* (2006.01)
*B22F 3/24* (2006.01)
*B33Y 30/00* (2015.01)
*B33Y 40/00* (2020.01)

(52) U.S. Cl.
CPC ........ *B23K 15/0086* (2013.01); *B22F 3/1055* (2013.01); *B22F 3/24* (2013.01); *B23Q 11/005* (2013.01); *B22F 2003/1056* (2013.01); *B22F 2003/1059* (2013.01); *B22F 2003/247* (2013.01); *B33Y 30/00* (2014.12); *B33Y 40/00* (2014.12); *Y02P 10/295* (2015.11)

(58) Field of Classification Search
CPC .............. B23K 26/063; B23K 26/0635; B23K 26/0656; B23K 26/067; B23K 2201/40
USPC .............. 219/121.6; 76/101.1, 108.6, 108.1; 409/11, 119, 118
See application file for complete search history.

(56) References Cited

U.S. PATENT DOCUMENTS

| | | | | |
|---|---|---|---|---|
| 4,011,792 A | * | 3/1977 | Davis .................. | B23Q 11/006 409/137 |
| 4,540,055 A | * | 9/1985 | Drummond ............. | E21B 21/16 175/323 |

(Continued)

FOREIGN PATENT DOCUMENTS

| | | |
|---|---|---|
| JP | 6-21909 U | 3/1994 |
| JP | 7-299622 A | 11/1995 |

(Continued)

*Primary Examiner* — Tu B Hoang
*Assistant Examiner* — Thomas J Ward
(74) *Attorney, Agent, or Firm* — Richard M. Goldberg

(57) ABSTRACT

In metal powder processing equipment where metal powder is sequentially laminated on a table inside a chamber and laser beam melting or electron beam melting, and shaping by a cutting tool subsequent to the melting are performed, unmolded powder remaining at the time of the melting and cut powder generated by the cutting can be scattered by generating air flow with respect to the cutting tool from either side of a main shaft or a tool holder. As a result, life of the cutting tool is prolonged and quality of a cut surface can be improved.

1 Claim, 5 Drawing Sheets

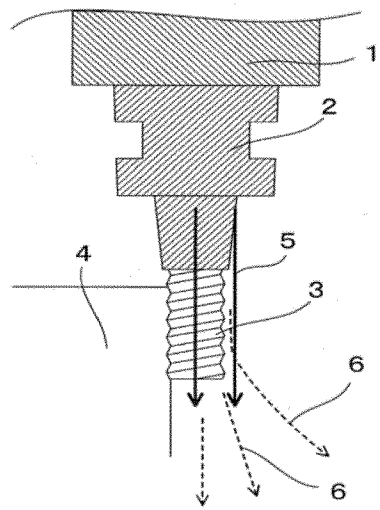

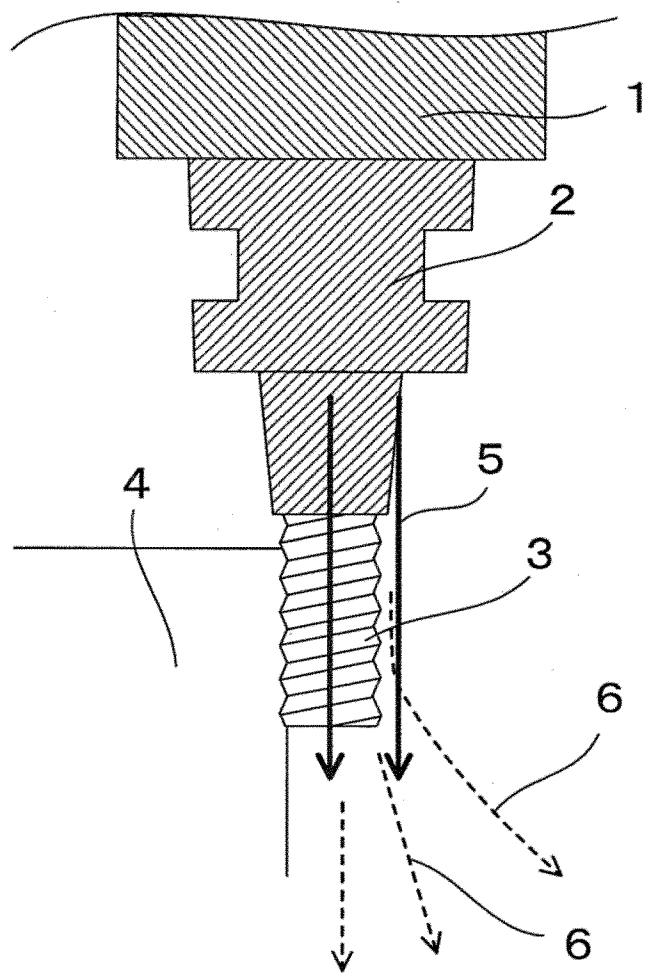
[Fig 1]

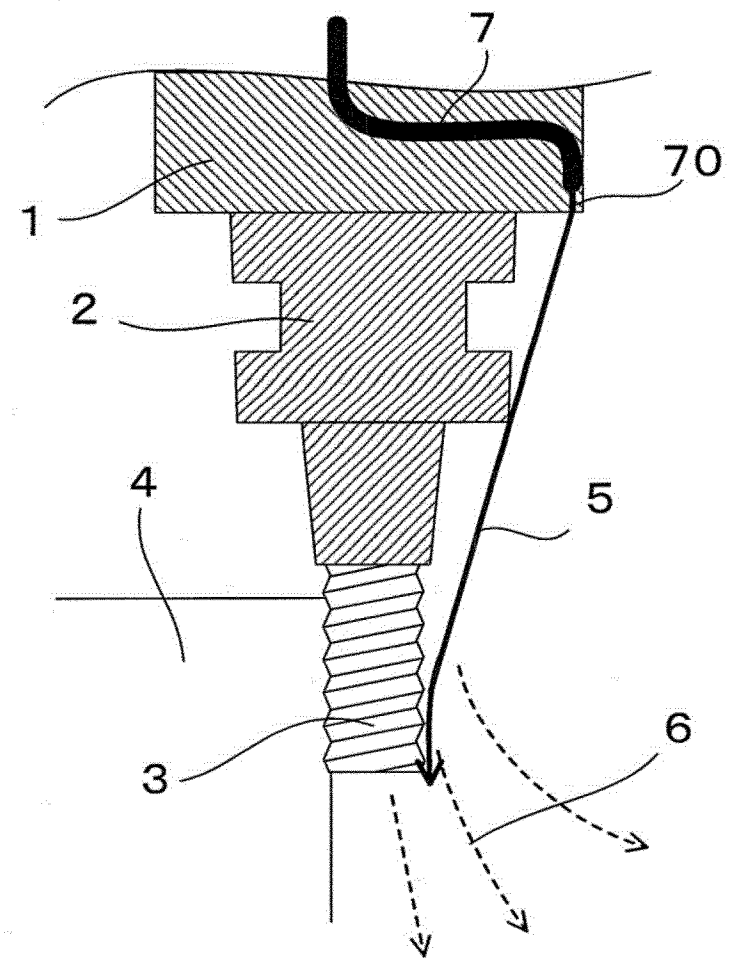
[Fig 2]